United States Patent [19]
Elliott et al.

[11] Patent Number: 5,572,649
[45] Date of Patent: *Nov. 5, 1996

[54] PROCESS FOR DYNAMICALLY SWITCHING BETWEEN A SINGLE TOP LEVEL WINDOW AND MULTIPLE TOP LEVEL WINDOWS

[75] Inventors: John D. Elliott, Aloha; Kevin A. Watts, Portland; Rune A. Skarbo, Hillsboro, all of Oreg.

[73] Assignee: Intel Corporation, Santa Clara, Calif.

[ * ] Notice: The term of this patent shall not extend beyond the expiration date of Pat. No. 5,544,300.

[21] Appl. No.: 151,282

[22] Filed: Nov. 12, 1993

[51] Int. Cl.$^6$ ............................................. G06F 3/14
[52] U.S. Cl. ........................... 395/340; 395/356; 395/501
[58] Field of Search ..................................... 395/157, 158, 395/160, 161, 155, 159, 156, 153, 154; 345/119, 120

[56] References Cited

U.S. PATENT DOCUMENTS

| Re. 32,632 | 3/1988 | Atkinson | 340/709 |
|---|---|---|---|
| 4,533,910 | 8/1985 | Sukonick et al. | 340/721 |
| 4,555,775 | 11/1985 | Pike | 364/900 |

(List continued on next page.)

FOREIGN PATENT DOCUMENTS 0239884  10/1987  European Pat. Off. .

OTHER PUBLICATIONS

Impact: An Interactive Natural–Motion–Picture Dedicated Multi–Media Authoring System; Hirotada Ueda, Takafumi Mityatake, and Satoshi Yoshizawa; Communications of the ACM, Mar., 1991, pp. 343–350.

Alexander, Visualizing cleared–off desktops, *Computer World*, May 6, 1991, p. 20.

Hiroshi Ishii, Kazuho Arita, Clearface: Translucent Multiuser Interface for Team WorkStation, *ECSCW*, Sep., 1991, pp. 6–10.

Hiroshi Ishii, Naomi Miyaka, Toward an Open Shared Workspace, *Communications of the ACM*, Dec., 1991, vol. 34, No. 12, pp. 37–50.

Learning Considerations in User Interface Design: The Room Model; Patrick P. Chan; publication of the Software Portability Laboratory, University of Waterloo, Waterloo, Ontario, Canada, Jul., 1984, pp. 1–44.

Creation/Modification of the Audio Signal Processor Setup for a PC Audio Editor; publication of International Business Machines, IBM Technical Disclosure Bulletin, vol. 30, No. 10, Mar. 1988, pp. 367–376.

(List continued on next page.)

*Primary Examiner*—Raymond J. Bayerl
*Assistant Examiner*—Crescelle N. dela Torre
*Attorney, Agent, or Firm*—Blakely, Sokoloff, Taylor & Zafman

[57] ABSTRACT

A central processing unit (CPU) is coupled both to a display that displays graphic and other data and to a pointer control device that permits a user to selectively position a pointer at a desired location on the display, and to signal the CPU of user selections. The CPU displays a parent window including a plurality of child windows which comprises a video conference application having a control panel window, a remote window and a local window as child windows. A function in the control panel, identified as a "ungroup" button function, may be selected by a user. The placement of the pointer over the ungroup button function and activation of the button function results in the CPU creating two new top level windows. The CPU reparents the remote and local child windows to the two new top level windows and displays the top level windows with the child windows on the display, thereby ungrouping the three child windows originally disposed within a single top level window. In the multiple window mode, a "group" button function may be selected by a user, the activation of which results in the CPU hiding the top level windows which will lose their child windows in the grouping operation. The CPU then reparents the child windows to a single top window. The remote and local child windows are reparented back to the top level window including the control panel child window. The CPU then displays the single top level window with the associated child windows disposed therein.

38 Claims, 9 Drawing Sheets

U.S. PATENT DOCUMENTS

| | | | |
|---|---|---|---|
| 4,622,545 | 11/1986 | Atkinson | 340/747 |
| 4,748,618 | 5/1988 | Brown et al. | 370/94 |
| 4,772,882 | 9/1988 | Mical | 340/709 |
| 4,785,408 | 11/1988 | Britton et al. | 364/513.5 |
| 4,812,834 | 3/1989 | Wells | 340/721 |
| 4,847,604 | 7/1989 | Doyle | 340/706 |
| 4,873,623 | 10/1989 | Lane et al. | 364/188 |
| 4,884,223 | 11/1989 | Ingle et al. | 364/550 |
| 4,890,098 | 12/1989 | Dawes et al. | 345/120 |
| 4,899,136 | 2/1990 | Beard et al. | 340/706 |
| 4,914,732 | 4/1990 | Henderson et al. | 340/825 |
| 4,931,783 | 6/1990 | Atkinson | 340/710 |
| 4,935,865 | 6/1990 | Rowe et al. | 364/188 |
| 4,939,507 | 7/1990 | Beard et al. | 340/706 |
| 4,977,455 | 12/1990 | Young | 358/455 |
| 5,008,853 | 4/1991 | Bly et al. | 364/900 |
| 5,062,060 | 10/1991 | Kolnick | 364/521 |
| 5,072,412 | 12/1991 | Henderson, Jr. et al. | 395/159 |
| 5,121,478 | 6/1992 | Rao | 395/157 |
| 5,148,154 | 9/1992 | Mackay et al. | 340/712 |
| 5,155,806 | 10/1992 | Hoeber et al. | 395/157 |
| 5,157,768 | 10/1992 | Hoeber et al. | 395/157 |
| 5,191,644 | 3/1993 | Takeda | 395/158 |
| 5,226,117 | 7/1993 | Miklos | 395/157 |
| 5,289,574 | 2/1994 | Sawyer | 395/157 |
| 5,371,847 | 12/1994 | Hargrove | 395/157 |
| 5,375,068 | 12/1994 | Palmer et al. | 364/514 |
| 5,377,317 | 12/1994 | Bates et al. | 395/157 |
| 5,390,295 | 2/1995 | Bates et al. | 395/157 |
| 5,487,143 | 1/1996 | Southgate | 395/157 |

OTHER PUBLICATIONS

Browsing Within Time–Driven Multimedia Documents; Stavros Christodoulakis and Steven Graham; publication of the Institute for Computer Research, University of Waterloo, Waterloo, Ontario, Canada, Jul., 1988, pp. 219–227.

PROCESS FOR DYNAMICALLY SWITCHING BETWEEN A SINGLE TOP LEVEL WINDOW AND MULTIPLE TOP LEVEL WINDOWS

BACKGROUND OF THE INVENTION

1. Field of the Invention

The present invention relates to apparatus and methods for displaying graphic information, and more particularly, the present invention relates to a computer controlled display system for displaying and manipulating overlapping windows of data on a display.

2. Art Background:

Over the past decade, a variety of graphic user interfaces have been developed to ease human interaction with computer systems. Many user interfaces utilize metaphors in the design of the interface as a way of maximizing human familiarity, and conveying information between the user and computer. Through the use of familiar metaphors, such as desk tops, notebooks and the like, the interface takes advantage of existing human mental structures to permit a user to draw upon the metaphor analogy to understand the requirements of the particular computer system. It is well known that designing around a familiar metaphor helps reduce human learning time. See for example, Patrick Chan "*Learning Considerations in User Interface Design: The Room Model*", Report CS-84-16, University of Waterloo Computer Science Department, Ontario, Canada, July 1984, and references cited therein.

In current generation systems, it is common for computer systems to incorporate so-called "object oriented" display systems which utilize multiple "windows" on a display in which combinations of text and graphics are disposed. Using a desk top metaphor, the windows may take the form of a variety of objects, such as file folders, loose leaf binders, or simple rectangles, and the windows may overlap one another with the "top" window constituting the current work file. A user operating within the context of a window-based graphic user interface ("GUI") operates on objects commonly found in an office, and therefore, provides non expert users with a familiar surrounding in which to interact with the computer.

In a typical window-based GUI system, visually distinct display objects are provided on the display screen, and are commonly referred to as "icons". Each of the icons represents a function or object on the desktop. In many systems, a cursor is also displayed which may be selectively moved in response to the movement of a mouse or other pointer control device. The cursor may be moved over display objects which the user may select on the screen. The user may delete information from a window, move data from one window to another, and generally operate on the windows as if an actual file or other physical object is being manipulated. A variety of "pull-down" menus also may be displayed, using a technique for selecting particular command options appearing along a menu bar, and subcommand items corresponding to the command options (See U.S. Pat. No. Re. 32,632).

The reader is referred to the following references which describe various aspects, method and apparatus associated with prior art graphic user interface design: U.S. Pat. No. Re. 32,632, U.S. Pat. Nos. 4,931,783, 5,072,412, and 5,148,154, and the references cited therein.

One of the problems associated with window based graphic user interfaces is the necessity of carefully managing display screen space. With multiple windows open, users may find that there is not enough screen space (screen "real estate") to adequately view the various window applications and icons while working. For example, in an audio/video/data (hereinafter "electronic") conferencing system, it is desirable for a user to view an application which is the subject of discussion with a remote user while viewing the remote user in a video window. Frequently, the user will also desire to view a local video window which displays the video image seen by the remote user as well as a video conference control panel. The ability to group windows and selectively ungroup the windows is desired to maximize the allocation of screen space.

As will be disclosed, the present invention provides a process for dynamically switching between a single top level window and multiple top level windows. In addition, the present invention discloses a user interface for dynamically converting between a single top level window and multiple level windows in a window-based display system.

SUMMARY OF THE INVENTION

An apparatus and method is disclosed which has application for use in computer controlled display systems, and in particular, display systems having object oriented graphic user interfaces. A central processing unit (CPU) is provided and is coupled to a display for displaying graphic and other data. The CPU is further coupled to a pointer control device which permits a user to selectively position a pointer at a desired location on the display, and signal the CPU of selections in accordance with the teachings of the present invention. The CPU displays a parent window including a plurality of child windows which, in the presently preferred embodiment, comprises a video conference application having a control panel window, a remote window and a local window. A button function is provided in the control panel window identified as a "ungroup" button function. The placement of the pointer over the ungroup button function and activation of the button function results in the CPU displaying two new top level windows. The CPU reparents the remote and local child windows to the two new top level windows and displays the top level windows (with the reparented child windows) on the display, thereby ungrouping the three child windows originally disposed within a single top level window. The three top level windows may then be manipulated and selectively positioned on the display by the user as desired. In the multiple window mode, a "group" button function is provided in the control panel window, the activation of which results in the CPU hiding the top level windows which lose their child windows in the grouping operation. The CPU reparents the child windows to a single top window. In the presently preferred embodiment, the remote and local child windows are reparented back to the top level window including the control panel child window. The CPU then displays the single top level window with the associated child windows disposed therein.

NOTATION AND NOMENCLATURE

Figure 1:
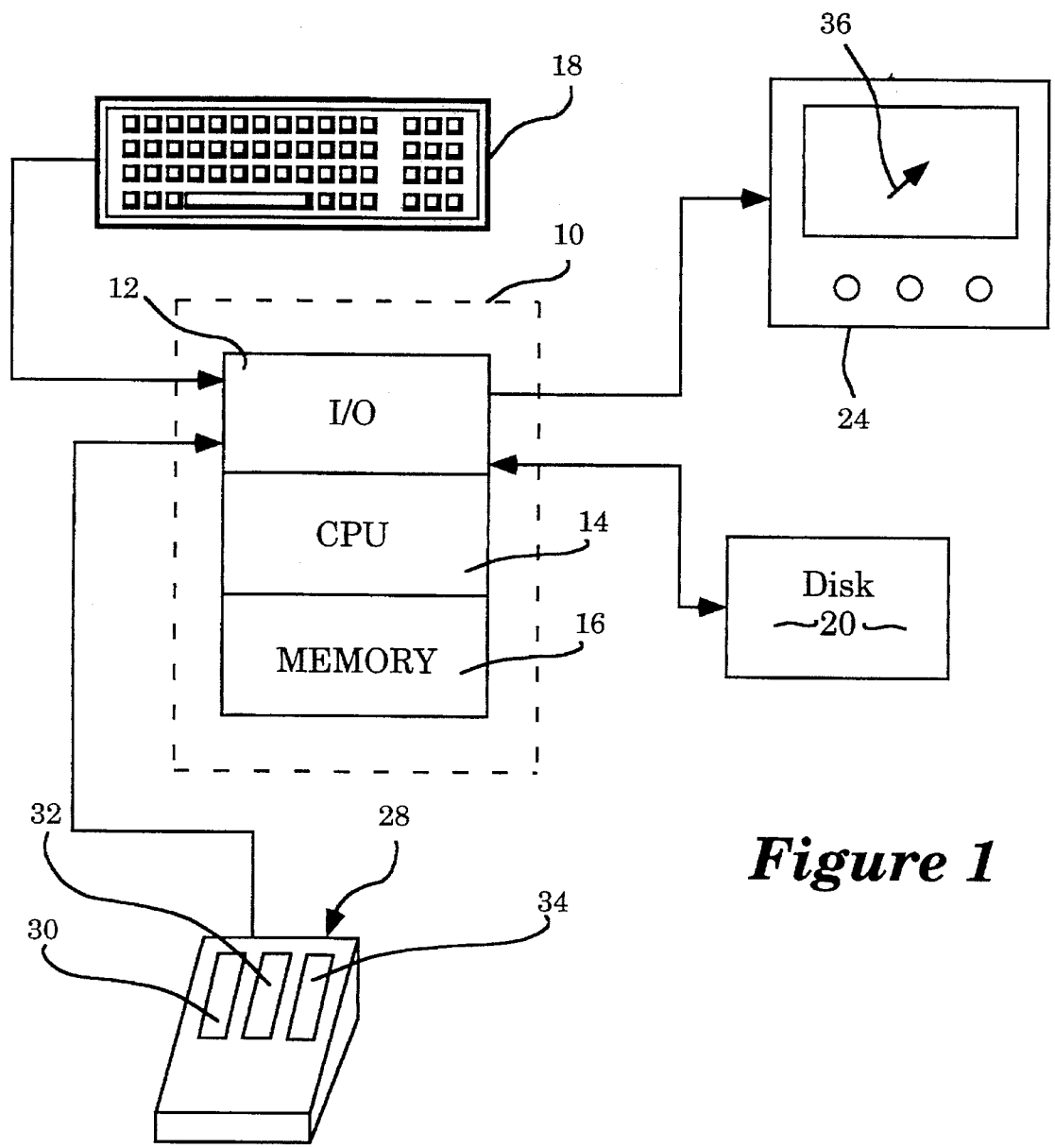
FIG. 1 illustrates a computer incorporating the teachings of the present invention.

The detailed descriptions which follow are presented largely in terms of algorithms and symbolic representations of operations on data bits within a computer memory. These algorithmic descriptions and representations are the means used by those skilled in the data processing arts to most effectively convey the substance of their work to others skilled in the art.

An algorithm is here, and generally conceived to be a self consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as windows, icons, desktops, bits, values, elements, symbols, characters, terms, numbers, or the like. It should be borne in mind, however, that all of these and similar terms are to be associated with the appropriate physical quantities and are merely convenient labels applied to these quantities.

Furthermore, the manipulations performed are often referred to in terms, such as adding or comparing, creating, allocating and/or associating, which are commonly associated with mental operations performed by a human operator. No such capability of a human operator is necessary, or desirable in most cases, in any of the operations described herein, which form part of the present invention; the operations are machine operations, although when dealing with a graphic user interface, by its nature, the man/machine interface utilizes some form of human input. Useful machines for performing the operations of the present invention include general purpose digital computers or other similar devices, such as, for example, those manufactured by the assignee, Intel Corporation. In all cases, there should be borne in mind the distinction between the method operations and operating a computer and the method of computation itself. The present invention relates to apparatus and methods for operating a computer and processing electrical or other physical signals to generate other desired results.

The present invention also relates to apparatus for performing these operations. This apparatus may be specially constructed for the required purpose or it may comprise a general purpose computer as selectively activated or reconfigured by a computer program stored in the computer. The images, algorithms, and data structures presented herein are not inherently related to any particular computer or other apparatus. In particular, various general purpose machines may be used with programs written in accordance with the teachings herein, or it may prove more convenient to construct more specialized apparatus to perform the required method steps. In addition, no particular programming language has been indicated for carrying out the various procedures described herein. This is due in part to the fact that not all languages that might be mentioned are universally available. Each user of a particular computer will be aware of the language which is most suitable for his immediate purposes. Accordingly, no detailed program listings have been provided. It is considered that the operations and other procedures described herein and illustrated in the accompanying drawings are sufficiently disclosed to permit one of ordinary skill to practice the instant invention or so much of it as is of use to him/her.

DETAILED DESCRIPTION OF THE INVENTION

The present invention discloses apparatus and methods for dynamically switching between a single top level window and multiple top level windows in a window-based computer display system. In particular, the present invention discloses a unique graphic user interface in which the user may selectively dynamically convert between a single top level window and various multiple level windows. In the following description, numerous specific details are set forth such as computer display system elements, display window formats, sample data, etc. in order to provide a more thorough understanding of the present invention. However, it will be apparent to one skilled in the art that the present invention may be practiced without these specific details. In other instances, well known circuits and structures are not described in detail so as not to obscure the present invention unnecessarily.

FIG. 1 illustrates a computer based system for generating graphic images in accordance with the teachings of the present invention. Shown is a computer 10 which comprises three major components. The first of these is an input/output (I/O) circuit 12 which is used to communicate information in appropriately structured form to and from other portions of the computer 10. In addition, computer 10 includes a central processing unit (CPU) 14 coupled to the I/O circuit 12 and a memory 16. These elements are those typically found in most general purpose computers and, in fact, computer 10 is intended to be a representative of a broad category of data processing devices. Also shown in FIG. 1 is a keyboard 18 to input data and commands into computer 10, as is well known. A magnetic disk 20 is shown coupled to I/O circuit 12 to provide additional storage capability for the computer 10. It will be appreciated that additional devices may be coupled to computer 10 for storing data such as magnetic tape drives, bubble memory devices, as well as networks which are in turn coupled to other data processing systems. As is well known, disk 20 may store other computer programs, characters, routines, etc., which may be accessed and executed by CPU 14. A raster display monitor 24 is shown coupled to the I/O circuit 12 and is used to display images generated by CPU 14 in accordance with the present invention. Any well known variety of cathode ray tube (CRT) display may be utilized as display 24. A cursor control device 28 is also shown coupled to computer 10 through I/O circuit 12. Cursor control device 28 includes switches 30, 32, and 34 for signaling CPU 14 in accordance with the teachings of the present invention. Cursor control device 28 (commonly known as a "mouse") permits a user to select various command modes, modify graphic data, and input other data utilizing switches 30, 32 and 34. More particularly, cursor control device 28 permits a user to selectively position a cursor 36 at any desired location on display 24 by movement of the cursor control device 28 over a surface. In the presently preferred embodiment, cursor control 28 utilizes well known methods for signaling CPU 14 of positional changes of cursor 36 by movement of cursor control over a surface. However, it will be appreciated that a variety of well known cursor control devices may be utilized by the present invention, including other cursor control devices such as mechanical mice, track balls, joy sticks, etc.

Figure 2:
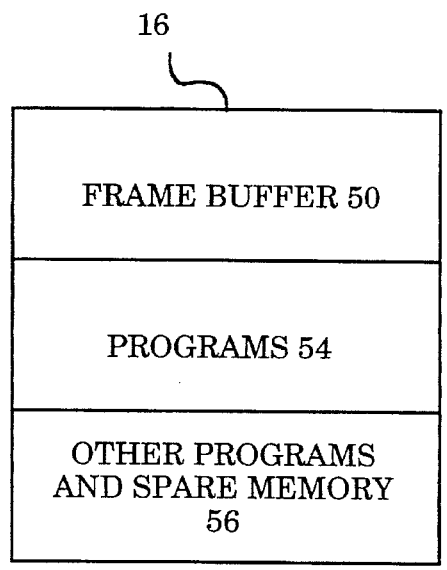
FIG. 2 shows one arrangement of program storage for the system of FIG. 1.

FIG. 2 shows one arrangement of major programs contained within the memory 16 illustrated in FIG. 1. In particular there is shown a frame buffer 50, which comprises a bit map of display 24. The frame buffer 50 represents the video memory for the display 24, wherein each storage location in the frame buffer 50 corresponds to a pixel on the display 24. Thus, the frame buffer comprises a two-dimensional array of points having known coordinates corresponding to the pixels on the raster display. In its simplest form, frame buffer 50 comprises a continuous block of memory which is allocated such that each memory location is mapped onto the corresponding pixel on the raster display 24. Memory 16 also includes a variety of other programs 54 for execution by the CPU 14. For example, a variety of control, display, and calculating programs implementing the operations and routines described in this specification may be stored in memory 16, as well as monitor control programs and disk operating systems. Moreover, memory 16 further includes space for other programs and spare memory (56) which may be used for a variety of other functions and operations in data processing systems.

Figure 3:
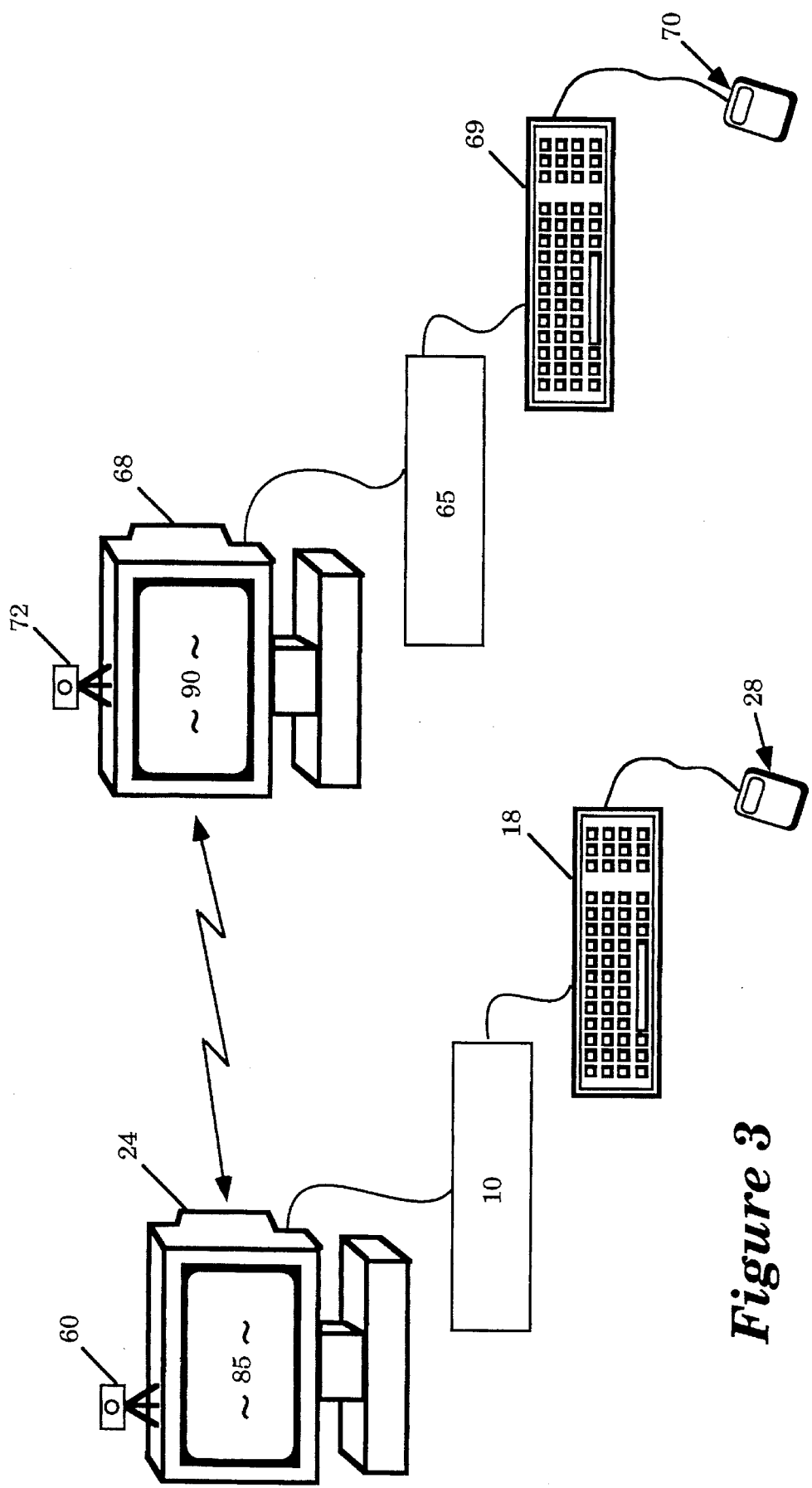
FIG. 3 illustrates a video conferencing system in accordance with the teachings of the present invention.

Referring now to FIG. 3, the computer system illustrated in FIG. 1, and the present invention as herein below described, may be included in an electronic conferencing system as diagrammatically illustrated in FIG. 3. As shown, the system of FIG. 1 further includes a video camera 60 which is coupled to the computer 10. The computer 10 is electronically coupled for communication with a second computer system for generating and displaying graphic images. The second system illustrated in FIG. 3 includes a computer 65 which is coupled to a display 68 and a keyboard 69. The computer system illustrated is substantially similar to that previously described with reference to FIG. 1. A cursor control device 70 is coupled to the keyboard 69, and the system includes a video camera 72, including a microphone (not shown) coupled to the computer 65. As is known, the electronic conferencing system illustrated in FIG. 3 permits a user operating the computer 10 to view a user, document or other object within the field of view of the camera 72 coupled to the computer 65. Similarly, a user operating a computer 65 may view the user of computer 10, a document or other object within the field of view of the video camera 60. In addition, software applications running on, for example, computer 10, may be simultaneously viewed on display 24, as well as display 68 coupled to computer 65.

The nature of the communication link between the computer 10 and the computer 65 may be over a local area network, fiber optic link, satellite link or other electronic communication means. Use of the electronic conferencing system illustrated in FIG. 3 permits the participants to conduct business or scientific meetings without the necessity of traveling, perhaps long distances, to meet in person. As will be described, the present invention has application to any window-based graphic user interface display system, and particularly, the present invention is described with reference to an electronic conferencing application. However, it will be appreciated that the present invention is not limited to use in an electronic conferencing environment, but is described with respect to an electronic conferencing application so as to provide a full and complete disclosure of the present invention.

Figure 4:
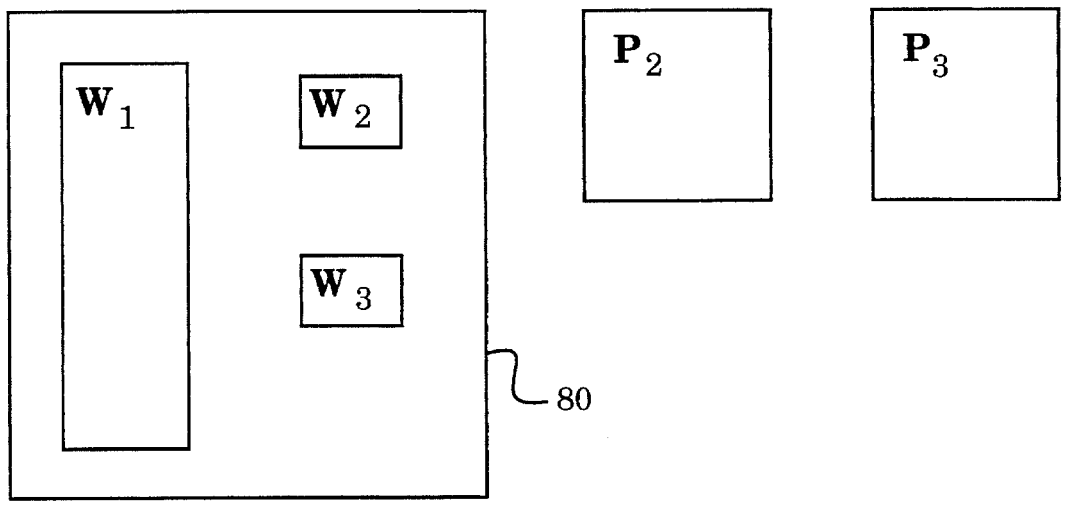
FIG. 4 illustrates the present invention's single window mode including hidden windows.

Referring now to FIG. 4, the process provided by the present invention for dynamically switching between a single top level window and multiple top level windows will be described. The current applications which operate in a graphic user interface environment (for example, the Microsoft®Windows 3.1 program) present themselves to a user either as a single top level window or as multiple windows (one which typically takes on the role as the main application window). A single top level window to be displayed on a display (for example, display 24 in the system illustrated in FIG. 1) is convenient in that it is easy for a user to position the application window on the screen of the display in a single step. In FIG. 4, the single application window is illustrated as parent window 80. As shown, parent window 80 includes "child" windows $W_1$, $W_2$, and $W_3$. Child windows $W_1$, $W_2$, and/or $W_3$ may include various functions which the user may select for the application program being executed within the parent window 80. In many instances, only a particular sub-part of the parent window 80 may be of interest to a user. For example, in a personal organizer software application, the user may be interested only in the daily schedule, while the card file and telephone dialer capabilities are of no interest. In a single window type application, the user may not detach the scheduler portion and hide other parts of the personal organizer application which are not needed. This results not only in wasted screen real estate, but also an excessive number of button functions and menus displayed on the display 24 which the user does not require. One solution which has been proposed is that the parent window 80 may be divided into a plurality of top level windows (in the example of FIG. 4, child windows $W_1$, $W_2$, and $W_3$). Thus, it has been proposed that in the example of a personal organizer/application, in which $W_1$ displays the daily schedule, window $W_2$ the card file and window $W_3$ the telephone dialer, that the windows $W_1$, $W_2$, and $W_3$ comprise top level parent window location on the screen display of the display 24. One problem with this solution is that it often becomes impossible to move an application, such as a personal organizer, as a whole out of the way in a single step to tidy up the desktop.

Continuing to refer to FIG. 4, the present invention provides that the child windows $W_1$, $W_2$, and $W_3$ are disposed within the parent window 80, and may include multiple nested child windows within the windows $W_1$, $W_2$, and $W_j$. As illustrated, in addition to the windows 80, $W_1$, $W_2$, and $W_3$, top level parent windows $P_2$ and $P_3$ are created but not displayed by the computer 10 on the display 24. In the presently preferred embodiment, the parent windows $P_2$ and $P_3$ may be created upon startup or upon demand, since they are not initially visible on display 24.

Figure 5:
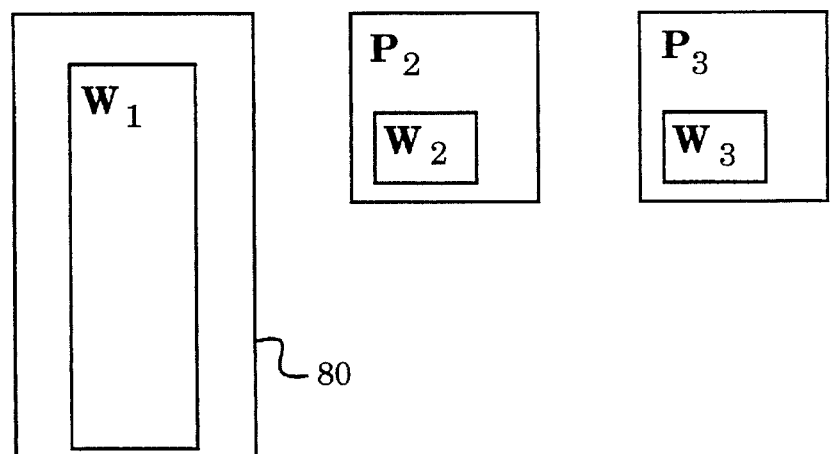
FIG. 5 illustrates the present invention's multiple window mode wherein the hidden windows have become visible, and child windows reparented to the now displayed top level parent windows.

Assume for sake of example that the user desires to reparent child windows $W_2$ and $W_3$ to the hidden parent windows P$_2$ and P$_3$. As illustrated in FIG. 5, the computer 10 reparents the child windows W$_2$ and W$_3$ to parent windows P$_2$ and P$_3$, and respectively renders parent windows P$_2$ and P$_3$ visible. Accordingly, the user viewing display 24 observes the parent window 80 with child window W$_1$, parent window P$_2$ with child W$_2$ and parent window P$_3$ with child window W$_3$, as shown. As top level windows, windows 80, P$_2$ and P$_3$ may be resized and otherwise manipulated as any parent window. Similarly, a user may "regroup" the child windows W$_2$ and W$_3$ into parent window 80, thereby returning to a display having the window appearance illustrated in FIG. 4. In accordance with the teachings of the present invention, in a regroup operation, computer 10 once again hides parent windows P$_2$ and P$_3$, and reparents the child windows W$_2$ and W$_3$ to the top window 80. Additionally, the now hidden windows P$_2$ and P$_3$ may be retained or, alternatively, destroyed by the computer 10 since they are no longer needed. It will be further noted that in the example shown in FIGS. 4 and 5, the parent windows may take any one of a variety of shapes and sizes, and that multiple child windows may be included within each of the parents and or nested therein, as is known in the art.

Figure 6:
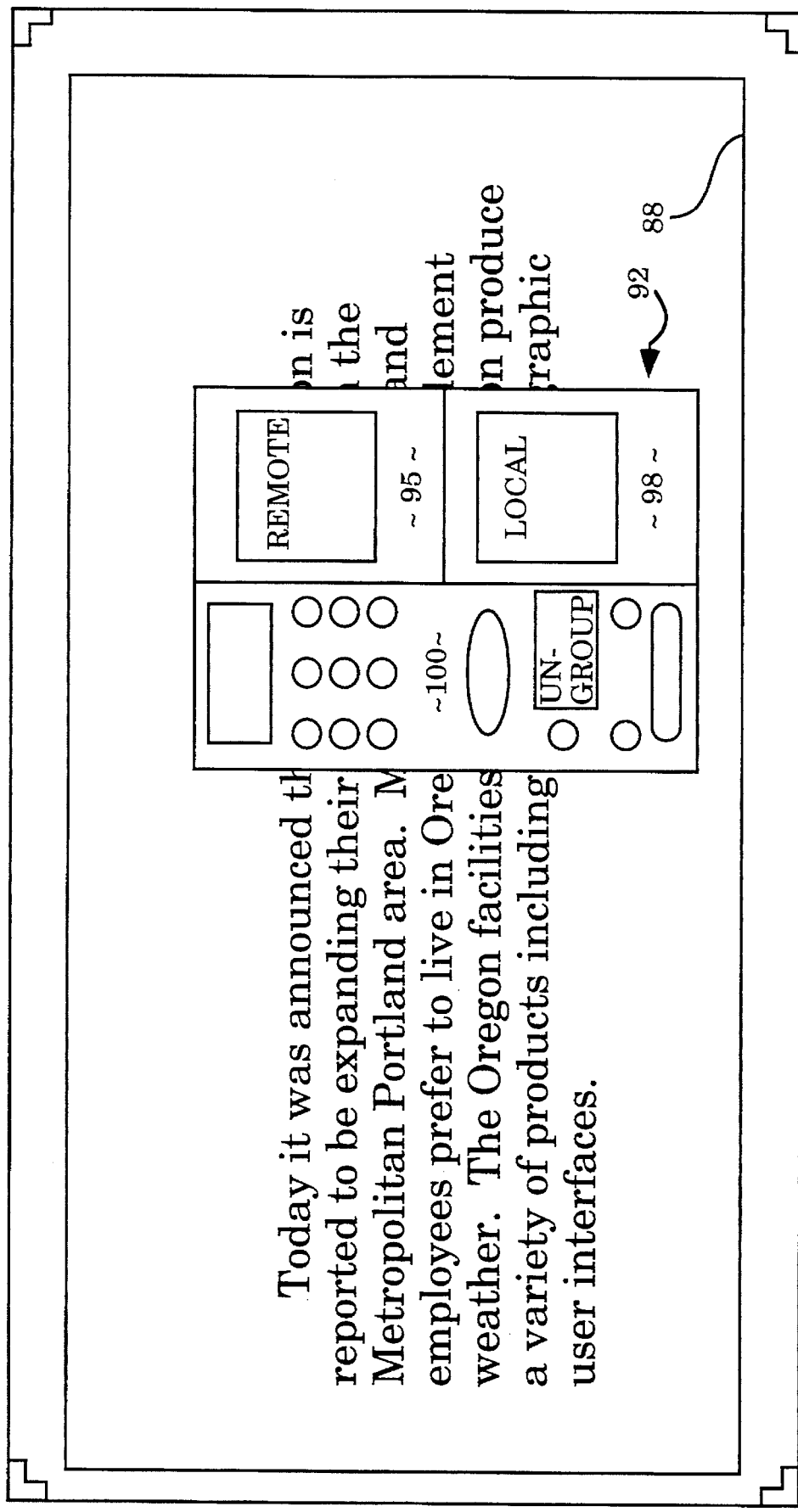
FIG. 6 illustrates the video conference user interface of the present invention wherein the application is displayed in a single window mode including a parent window having a remote window, a local window and a control panel window.

Referring once again to FIG. 3 and now FIG. 6, the present invention will be described as it is applied to an electronic conferencing graphic user interface. As previously described with reference to FIG. 3, an electronic conferencing system may include a computer 10 electronically coupled to communicate with a remote computer 65. A video camera 60 coupled to the computer 10 provides a field of view for capturing for the user of the computer 10, other documents, charts, white board diagrams, data, audio, etc. The image from video camera 60 is transmitted using electronic conferencing technology to the computer 65 where it is displayed on the display 68. Similarly, a video camera 72 captures the user of computer 65, documents and the like and transmits the image captured by camera 72 to computer 10 on the display 24. FIG. 6 illustrates one possible application of the conferencing system shown in FIG. 3. For sake of example, assume that the computer 10 is considered the "local" computer and the computer 65 is considered the "remote" computer. Illustrated in FIG. 6 is a display screen 85 of the display 24. The screen 85 includes a graphic user interface for the electronic conferencing application which permits various applications such as word processing programs, spread sheets, and the like to be simultaneously displayed on display 24 and display 68, thereby permitting the users of computers 10 and 65 to interactively modify documents, and conduct meetings as if the users were conferencing in the same room.

In the example illustrated in FIG. 6, a word processing window 88 is displayed on screen 85. A variety of textural information, such as for example, a press release document, or the like is displayed within the word processing window 88, and is simultaneously displayed on the display screen 90 of display 68 coupled to the remote computer 65. An electronic conferencing application window 92 includes a remote video window 95, and a local video window 98. Additionally, the electronic conferencing window 92 includes a control panel window 100 having a plurality of button functions for operation of the electronic conference application program. Additional features and functions of the electronic conference window 92 will be described with reference to FIG. 7, below.

As a single parent window, electronic conference window 92 may be selectively positioned by the user at any location on screen 85. It will be appreciated that, in a single window mode, the movement of window 92 to other locations on the display 85 results in the movement of all three child windows 95, 98, and 100, simultaneously, since they form a part of the parent window 92.

Figure 7:
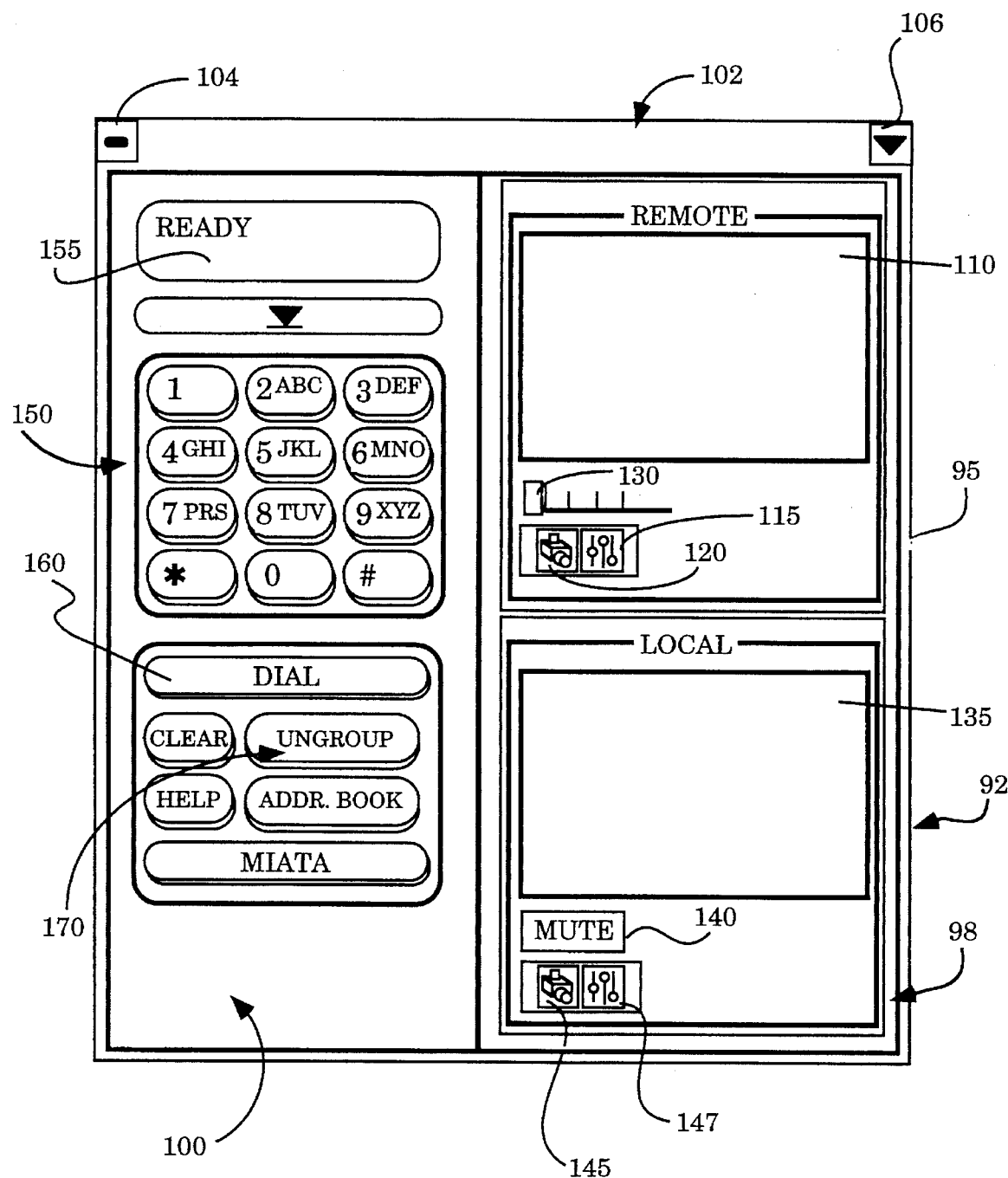
FIG. 7 illustrates the video conference application in a single window mode.

As illustrated in FIG. 7, video conference parent window 92 includes a title bar 102, a menu button 104 and a "minimization" button function 106. Disposed within the video conference window 92 is the remote window 95. The remote window 95 includes a remote video display window 110 which displays the image captured by video camera 72. Additionally, remote window 95 includes other button functions such as button functions 115 and 120, as well as a slider 130.

Local window 98 includes a local window video display 135 in which the image captured by video camera 60 is displayed. Additional button functions disposed within the window 98 include a mute button function 140, as well as additional button functions 145 and 147, as shown. The control window 100 includes various button functions necessary for the operation of the video conference application. For example, as illustrated in FIG. 7, a keypad identified generally by the numeral 150 permits the user to input numbers by placing the pointer 36 (not shown) over the numbers comprising the key in numeric keypad 150 and signaling the computer using, for example, one of the switches disposed on the cursor control device 28. A display window 155 displays the numbers, and/or other commands entered by the user using the control window button functions. A dial button function 160 may be activated by the user to dial the inputted phone number to electronically video conference computer 10 to, for example, the computer 65 illustrated in FIG. 3. As shown in FIG. 7, a button function entitled "ungroup" 170 is provided within the control panel window 100. As will be described, the activation of the button function ungroup 170 results in the window 92 dynamically converting between a single top level window and multiple top level windows, as described in the present specification.

Figure 8:
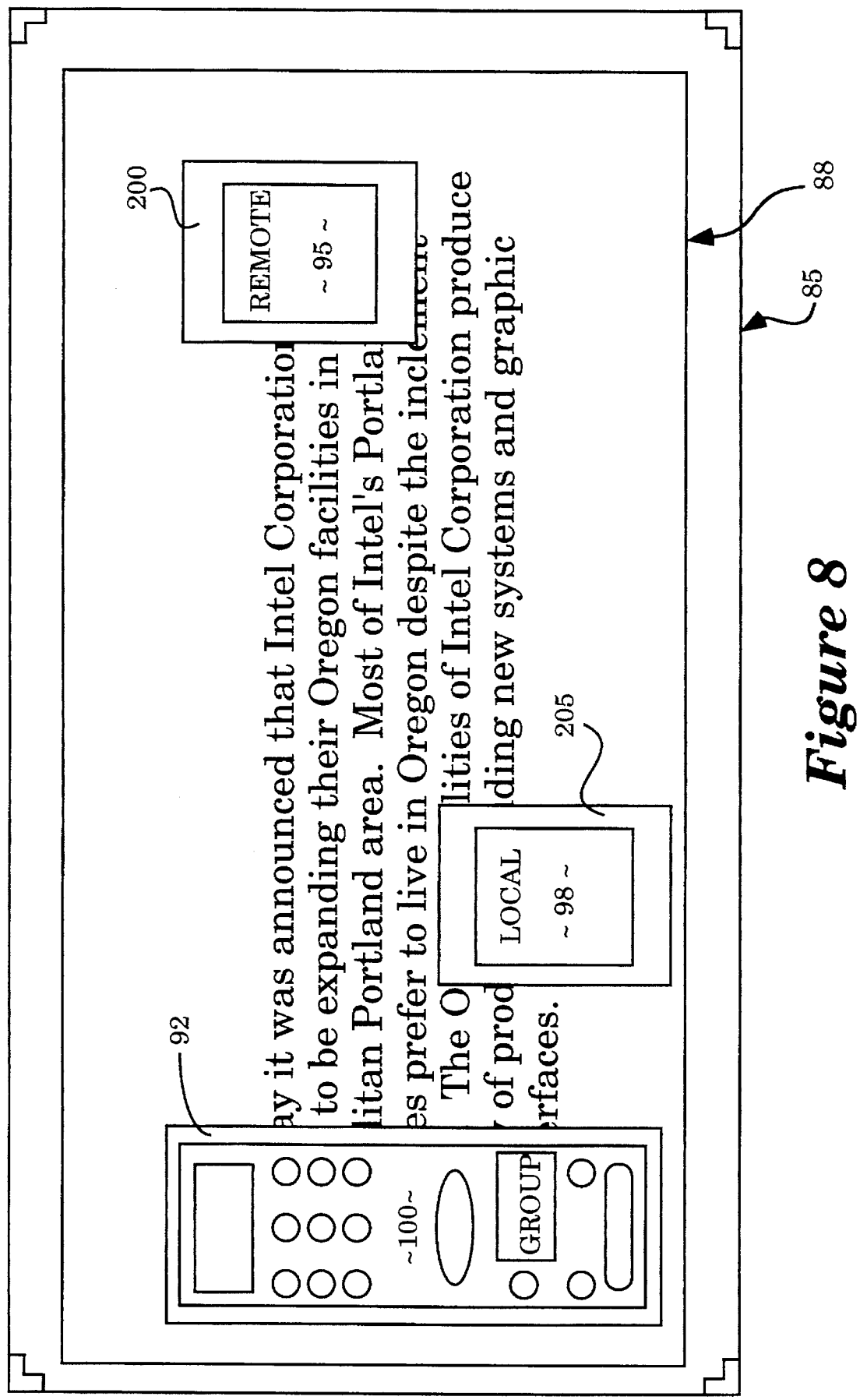
FIG. 8 illustrates the video conference user interface of the present invention wherein the application is displayed in a multiple window mode including three separate top level windows.

In accordance with the teachings of the present invention, the activation of the ungroup button function 170 results in the video conference application entering a multiple window mode. As illustrated in FIG. 8, the control panel 100, remote window 95 and local window 98 are reconfigured such that each of these "child windows" are disposed in a top level window as previously described above with reference to FIGS. 4 and 5. The remote window 95 is reparented to a top level window 200, the local window 98 is reparented to a top level window 205, and the control panel window 100 is retained within a now reconfigured top level window 92. As independent top level windows, windows 92, 205 and 200 may be selectively located and positioned anywhere within the screen 85. It will be appreciated that although the present invention has been described with reference to display screen 85 of the computer 10, that an identical application with associated features may also be displayed on screen 90 of the computer 65. However, for simplicity and ease of description, only the electronic conference application of the present invention as displayed on screen 85 is described herein.

Figure 9:
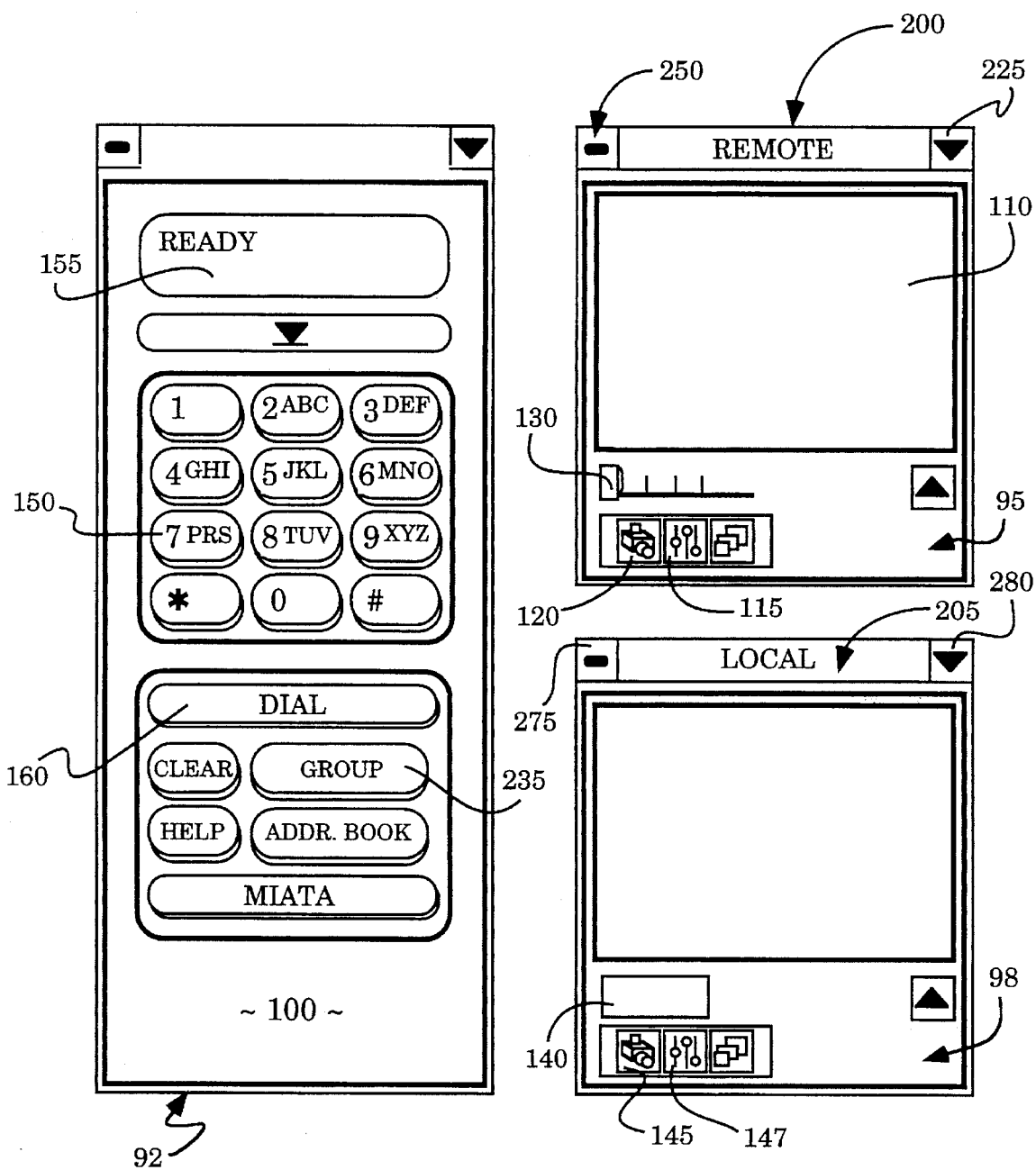
FIG. 9 illustrates the video conference application of the present invention wherein the multiple window mode includes a remote parent window, a local parent window and a control panel parent window.

As shown in FIG. 9, each of the top level windows 92, 200 and 205 are shown in additional detail. The child control panel 100 is disposed within, and substantially subsumes, top level window 92. The remote window 95 is disposed within a top level window 200, wherein the top level window 200 includes a variety of top level button functionality, for example, a menu button 250 and a minimization button 255. Similarly, the local window 98 is disposed within a top level window 205 wherein the top level window also includes a menu button function 275 and a minimization button function 280, as shown. Thus, the top level windows 92, 200 and 205 may be minimized, resized, and otherwise manipulated as any top window may in a window-based graphic user interface environment. This functionality provides the user of the video conference application with the freedom to choose which windows to display during a conference. For example, if it is no longer necessary to utilize the control panel window 100, then the control panel may be minimized to an icon, as is known in the art. Similarly, the remote window 200 may be iconized or resized, as can the local window 205.

As illustrated in FIG. 9, the ungroup button function 170 is modified to become a "group" button function 235 when the present invention is in a multiple window mode as shown in FIG. 9. The activation of the group button function 235 results in the "reassembly" of the various window components illustrated in FIG. 9, such that the child windows 100, 95 and 98 are reparented to be disposed within top level window 92, as previously described with reference to FIGS. 4 and 5.

Figure 10:
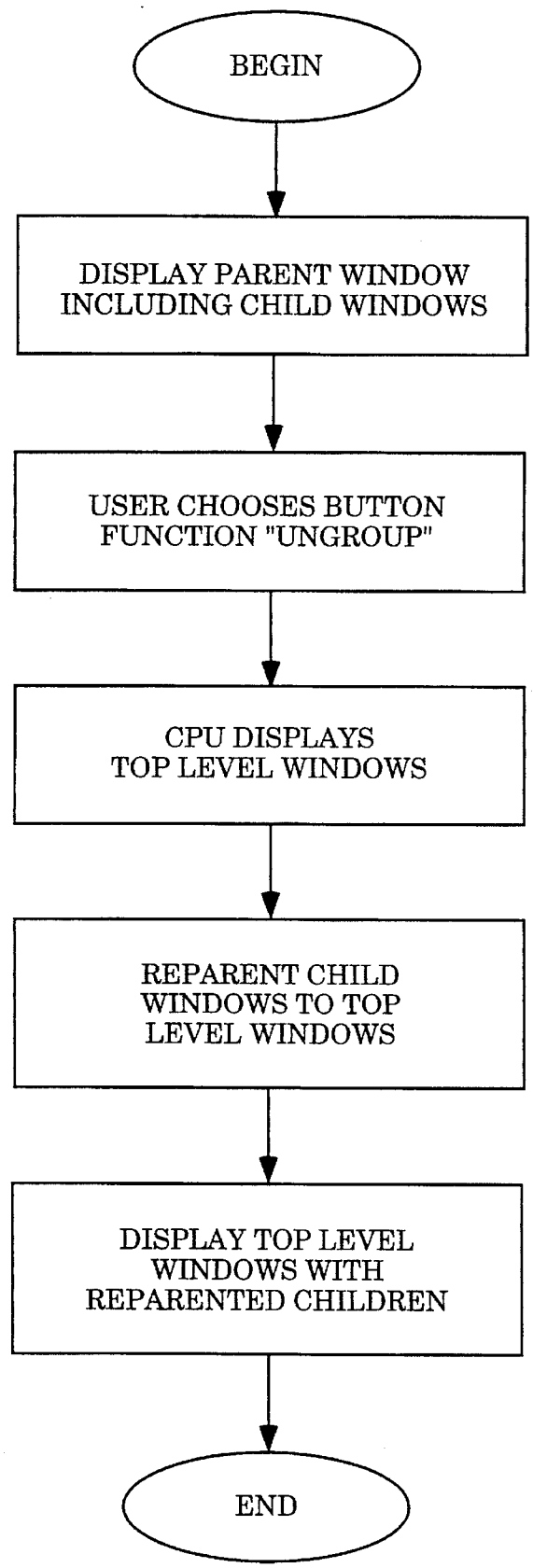
FIG. 10 is a flow chart illustrating the sequence of steps utilized by the present invention to convert between a single top level window to multiple top level windows.
Figure 11:
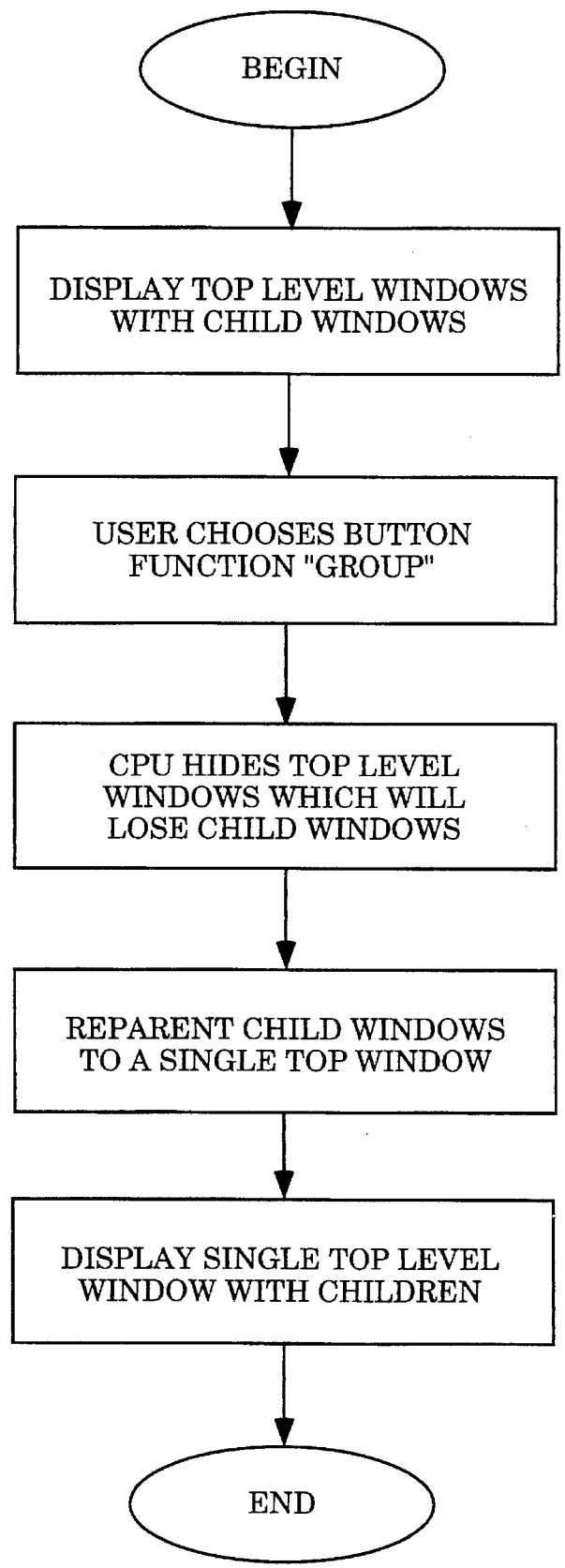
FIG. 11 is a flow chart illustrating the sequence of steps utilized by the present invention to convert between multiple top level windows and a single top level window.

Referring now to FIG. 10, therein is illustrated a flow chart outlining the sequence of steps utilized by the present invention to "ungroup" the windows 100, 95 and 98. As previously described, the computer, such as for example computer 10, displays the parent window (92) including the child windows 95 and 98. The user then may select the button function within the control panel window 100 "ungroup" 170. The CPU of the computer 10 then creates (or displays if the windows were previously created) a new top level window (windows 200 and 205) and reparents the child windows 95 and 98 to the new to level windows 200 and 205, respectively. The computer 10 displays the top level windows 92, 200, and 205 on the display screen 85 with the parented child windows (see FIG. 9). Similarly, in the event a user activates the button function "group" 235, the computer 10 hides or destroys the top level windows 200 and 205 which will lose the child windows 95 and 98. The computer 10 reparents the child windows 95 and 98 to the single top window (window 92) along with the child window 100. Thus, the user observes a single top level window 92 with child windows 100, 95 and 98 disposed therein (see FIG. 7).

Although the present invention has been described with reference to particular window examples in FIGS. 1 through 11, it will be appreciated by one skilled in the art that the present invention may be implemented in any one of a number of various windows and window configurations on a display system. Similarly, particular button functions illustrated in the figures are only representative of only one of many possibilities of button and command configurations which may utilize the present invention.

For example, the present invention contemplates that rather than using "Group" and "Ungroup" button functions, it is possible to use a drag and drop process to achieve the same result. A child window may be dragged from the parent window onto the desktop of the display screen to create a new top level window, thereby achieving the present invention's ungroup function. To accomplish the present invention's group function, the top level window may be dragged onto the original parent window, thereby grouping the windows. Accordingly, the group and ungroup functions and signals of the present invention may be accomplished through the use of a drag and drop methodology, and it is contemplated that these processes are equivalent in function and result.

Moreover, it will be understood that the figures are for illustration only, and should not be taken as limitations upon the invention. It is contemplated that any changes and modifications may be made, by one of ordinary skill in the art, to the materials and arraignments of the elements of the invention without departing from the spirit and scope of the invention as disclosed above.

We claim:

1. A computer implemented method for displaying and operating upon a plurality of windows comprising the steps of:

generating and displaying a first top level window including a first child window and a second child window;

upon receiving an ungroup signal displaying a second top level window and reparenting said second child window to said second top level window;

displaying said first top level window having said first child window disposed therein and said second top level window having said second child window on said display.

2. The method as defined in claim 1 wherein each of said first and second top level windows may be selectively positioned on a display by a user using a cursor control device.

3. The method as defined by claim 2 further including a third child window disposed in said first top level window, and further including the steps of:

displaying a third top level window;

upon receipt of said ungroup signal reparenting said third child window to said third top level window, and displaying said third top level window on said display.

4. The method as defined by claim 3 further including the steps of:

said user providing a group signal;

upon receipt of said group signal, hiding said second and third top level window such that said second and third top level windows are not displayed and reparenting said second and third child windows to said first top level window;

displaying said first, second and third child windows in said first top level window.

5. The method as defined by claim 4 wherein said ungroup signal is generated by said user placing a cursor controlled by said cursor control device over an ungroup button function displayed on said display and momentarily activating a switch.

6. The method as defined by claim 5 wherein said group signal is generated by said user placing a cursor controlled by said cursor device over a group button function displayed on said display and momentarily activating a switch.

7. The method as defined by claim 6 wherein said first child window comprises a video conference control panel having a plurality of button functions including said group and ungroup button functions.

8. The method as defined by claim 7 wherein said second child window comprises a remote video conference window.

9. The method as defined by claim 8 wherein said third child window comprises a local video conference window.

10. A computer implemented method for displaying and operating upon a plurality of windows comprising the steps of:

generating and displaying a first top level window including a first child window and a second top level window including a second child window;

receiving a group signal;

upon receipt of said group signal, hiding said second top level window such that said second top level window is not displayed and reparenting said second child window to said first top level window; and displaying said first and second child windows in said first top level window.

11. The method as defined by claim 10 further including the steps of:

receiving an ungroup signal, upon receipt of the ungroup signal, generating a second top level window and reparenting said second child window to said second top level window; and displaying said first top level window having said first child window disposed therein and said second top level window having said second child window on said display.

12. The method as defined by claim 11 wherein each of said first and second top level windows may be selectively positioned on said display by a user having a cursor control device.

13. The method as defined by claim 12 further including a third child window disposed in said first top level window, and further including the steps of:

creating a third top level window;

upon receipt of said ungroup signal reparenting said third child window to said third top level window, and displaying said third top level window on said display.

14. The method as defined by claim 13 wherein said ungroup signal is generated by said user placing a cursor controlled by said cursor control device over an ungroup button function displayed on said display and momentarily activating a switch.

15. The method as defined by claim 14 wherein said group signal is generated by said user placing a cursor controlled by said cursor control device over a group button function displayed on said display and momentarily activating a switch.

16. The method as defined by claim 15 wherein said first child window comprises a video conference control panel having a plurality of button functions including said group and ungroup button functions.

17. The method as defined by claim 16 wherein said second child window comprises a remote video conference window.

18. The method as defined by claim 17 wherein said third child window comprises a local video conference window.

19. A computer display system having a central processing unit (CPU) coupled to a display such that data is displayed on said display in a plurality of windows, said windows including top level windows and child windows disposed in said top level windows, said computer controlled display system comprising:

window generation means coupled to said CPU for generating and displaying a first top level window including a first child window and a second child window on said display;

signal generation means coupled to said CPU for providing an ungroup signal to said CPU, such that said CPU displays a second top level window and reparents said second child window to said second top level window, said CPU displaying said first top level window having said first child window disposed therein and said second top level window having said second child window on said display.

20. The display system as defined by claim 19 wherein each of said first and second top level windows may be selectively positioned on said display by a user using a cursor control device coupled to said CPU.

21. The display system as defined by claim 20 further including a third child window disposed in said first top level window wherein said window generation means creates a third top level window and upon receipt of said ungroup signal by said CPU said CPU reparents said third child window to said third top level window, and displays said third top level window on said display.

22. The display system as defined by claim 21 wherein said signal generation means provides a group signal to said CPU, said CPU upon receipt of said group signal dismisses said second and third top level windows such that said second and third top level windows are no longer displayed and reparents said second and third child windows to said first top level window, said CPU displaying said first, second and third child windows in said first top level window.

23. The display system as defined by claim 22 wherein said signal generation means generates said ungroup signal when a user places a cursor controlled by said cursor control device over an ungroup button function displayed on said display and momentarily activates a switch coupled to said CPU.

24. The display system as defined by claim 23 wherein said signal generation means generates said group signal when said user places a cursor controlled by said cursor control device over a group button function displayed on said display and momentarily activates a switch coupled to said CPU.

25. The display system as defined by claim 24 wherein said first child window comprises a video conference control panel having a plurality of button functions including said group and ungroup button functions.

26. The display system as defined by claim 25 wherein said second child window comprises a remote video conference window.

27. The display system as defined by claim 26 wherein said third child window comprises a local video conference window.

28. A computer display system having a central processing unit (CPU) coupled to a display such that data is displayed on said display in a plurality of windows, said windows including top level windows and child windows disposed in said top level windows, said computer display system comprising:

window generation means coupled to said CPU for generating and displaying a first top level window including a first child window and a second top level window including a second child window on said display;

signal generation means coupled to said CPU for providing a group signal to said CPU;

said CPU upon receipt of said group signal, dismissing said second top level window such that said second top level window is no longer displayed and reparents said second child window to said first top level window such that said CPU displays said first and second child windows in said first top level window.

29. The display system as defined by claim 28 wherein said signal generation means provides an ungroup signal to said CPU, such that said CPU creates a second top level window and reparents said second child window to said second top level window, said CPU displaying said first top level window having said first child window disposed therein and said second top level window having said second child window on said display.

30. The display system as defined by claim 29 wherein each of said first and second top level windows may be selectively positioned on said display by a user using a cursor control device coupled to said CPU.

31. A computer-implemented method for displaying a plurality of windows and operating upon said windows comprising the steps of:

a) generating and displaying a first top-level window on the display, said first top-level window including a first child window and a second child window;

b) receiving an ungroup signal; and c) in response to receiving the ungroup signal, reparenting said second child window to a second top-level window.

32. The method, as defined by claim 31, wherein each of said first and second top-level windows is selectively positionable on a display by a user using a cursor-controlled device.

33. The method, as defined by claim 31, further comprising the steps of:

a) receiving a group signal;

b) in response to said group signal, hiding at least one of said top-level windows, wherein said hidden top-level window is not displayed and reparenting said second child window to a remaining top-level window, and wherein said remaining top-level window includes the first child window and the second child window.

34. The method, as defined by claim 33, wherein said ungroup signal is generated by said user placing a cursor, controlled by said cursor control device, over an ungroup button function display and momentarily activating a switch.

35. The method, as defined by claim 34, wherein said group signal is generated by said user placing a cursor, controlled by said cursor control device, over a group button function displayed and momentarily activating a switch.

36. The method, as defined by claim 31, wherein step c) further includes the steps of generating and displaying said second top-level window.

37. The method, as defined by claim 31, further comprising the step of displaying said first top-level window having said first child window disposed therein, and said second top-level window having said second child window.

38. The method, as defined by claim 33, further comprising the step of displaying said remaining top-level window having said first and second child windows disposed therein.

* * * * *

UNITED STATES PATENT AND TRADEMARK OFFICE
CERTIFICATE OF CORRECTION

PATENT NO. : 5,572,649
DATED : November 5, 1996
INVENTOR(S) : Elliot et al.

It is certified that error appears in the above-indentified patent and that said Letters Patent is hereby corrected as shown below:

In column 6 at line 51 delete "window" and insert --windows and are positionable at any--

Signed and Sealed this

First Day of April, 1997

Attest:

Attesting Officer

BRUCE LEHMAN

Commissioner of Patents and Trademarks